United States Patent Office 3,203,967
Patented Aug. 31, 1965

3,203,967
3β-HALO-Δ⁵ AND 3-DESOXY-Δ⁵ CORTICAL HORMONES
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Dec. 26, 1961, Ser. No. 162,231
24 Claims. (Cl. 260—397.45)

The present invention relates to novel cyclopentanophenanthrene compounds and to a process for the production thereof.

More particularly the present invention relates to 3-β halo-Δ⁵ and 3-desoxy-Δ⁵ derivatives of cortical hormones.

The novel compounds of the present invention which are glycogenic and anti-inflammatory agents possessing anti-androgenic, anti-estrogenic and anti-gonadotrophic properties are represented by the following formula:

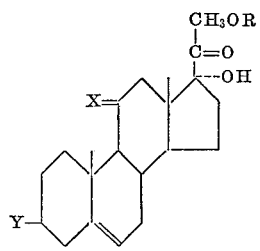

In the above formula X represents keto or β-hydroxy, Y represents chlorine, bromine, fluorine or hydrogen; R may be hydrogen or an acyl group derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopenthylpropionate, aminoacetate and β-chloropropionate.

The novel compounds of the present invention are prepared by the process illustrated by the following equation:

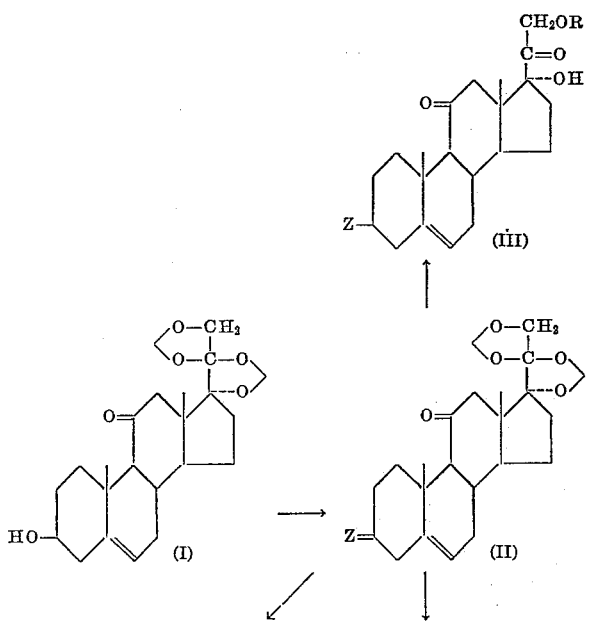

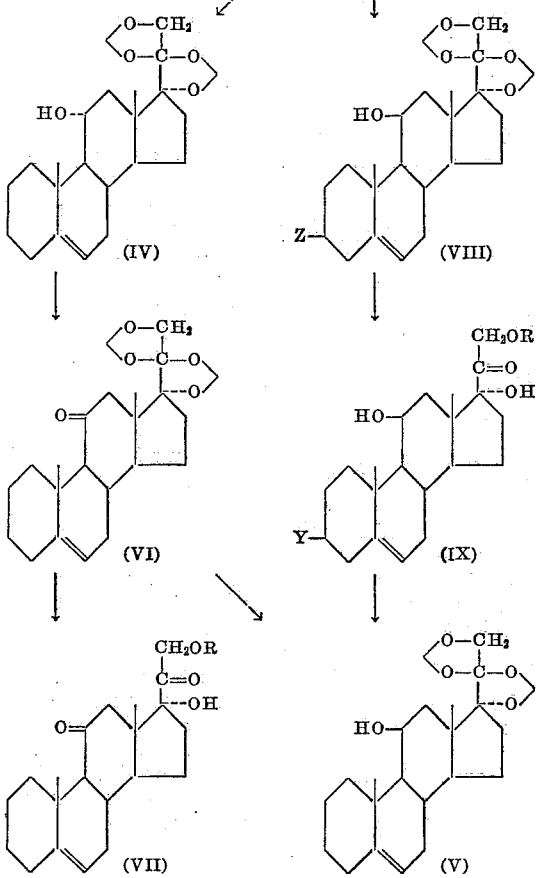

In the above formulas R and Y have the same meaning as set forth hereinbefore and Z represents fluorine, chlorine or bromine.

In practicing the process outlined above Δ⁵-pregnen-3β,17α,21-triol-11,20-dione-21-acetate is saponified in a basic medium such as a methanolic solution of potassium hydroxide to give Δ⁵ - pregnen - 3β,17α,21 - triol - 11,20-dione. Upon conventional treatment of this latter compound with formaldehyde in the presence of an acid, as for example hydrochloric acid, yields the corresponding 17,20;20,21-bismethylenedioxy derivative (I). Reaction of this compound with a halogenating agent such as hydrogen fluoride, phosphorus pentachloride or phosphorus pentabromide, in a solvent inert to the reagent, furnishes the corresponding 3β-halo-17,20;20,21-bismethylenedioxy-Δ⁵-pregnen-11-one (II). This latter compound is treated with an alkali metal, preferably sodium, in liquid ammonia for a period of time of the order of 5 minutes, giving the respective 3 - desoxy - 17,20;20,21-bismethylenedioxy-Δ⁵-pregnen-11αol (IV). Oxidation of the 11α-hydroxy group of the latter compound with a suitable reagent preferably 8 N chromic acid yields the corresponding 17,20;20,21 - bismethylenedioxy - Δ⁵-pregnen-11-one (VI).

The aforementioned 3-desoxy or 3β-halo-17,20;20,21-bismethylenedioxy-Δ⁵-pregnen-11-one compounds are reduced, preferably with sodium borohydride, affording the respective 3 - desoxy (V) or 3β - halo - 17,20;20,21-bismethylenedioxy-Δ⁵-pregnen-11β-ols (VIII).

The hereinbefore obtained 3β-halo and 3-desoxy-17,20;20,21-bismethylenedioxy derivatives (II, V, VI, VIII) upon hydrolysis in an acid medium, preferably 50% acetic acid, at reflux temperature for a period of time of the order of 25 minutes yield the corresponding $\Delta^5$-pregnen-17α,21-diol-20-one derivatives (III, VII, IX; R=H).

These compounds are conventionally acylated in pyridine with an acylating agent as for example acetic anhydride or propionic anhydride, affording the corresponding 21-acyloxy derivatives (III, VII, IX; R=acyl).

The following specific examples serve to illustrate but are not intended to limit the scope of the present invention:

Example I 6 g. of $\Delta^5$-pregnen-3β,17α,21-triol-11,20-dione-21-acetate [Wall, J. Am. Chem. Soc. 81, 411 (1959)] dissolved in 150 cc. of methanol and treated with 15 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing $\Delta^5$-pregnen-3β,17α,21-triol-11,20-dione.

Example II

A solution of 5 g. of the compound produced in the preceding example in 40 cc. of 37% aqueous formaldehyde was treated with 0.5 cc. of concentrated hydrochloric acid and the mixture stirred for 48 hours at room temperature. It was then poured into water, the formed precipitate filtered off, washed with water to neutral and dried under vacuum thus affording 17,20;20,21-bismethylenedioxy-$\Delta^5$-pregnen-3β-ol-11-one mixed with the 3-methylenedioxy derivative thereof.

The foregoing mixture was heated on the steam bath with 200 cc. of 50% acetic acid under nitrogen for 30 minutes, it was then concentrated under vacuum to a small volume and poured into water. The precipitate was collected, washed well with water, dried and recrystallized from acetone-hexane, thus furnishing pure 17,20;20,21-bismethylenedioxy-$\Delta^5$-pregnen-3β-ol-11-one.

Example III

To a solution of 5 g. of the latter steroid in 100 cc. of benzene were added 5 g. of phosphorus pentachloride and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone-hexane yielded 3β-chloro-17,20;20,21-bismethylenedioxy-$\Delta^5$-pregnen-11-one.

Following the same procedure except that phosphorus pentachloride was substituted by phosphorus pentabromide there was obtained 3β-bromo-17,20;20,21-bismethylenedioxy-$\Delta^5$-pregnen-11-one.

Example IV

In a polyethylene flask, adapted with magnetic stirrer, there was dissolved 2.8 g. of 17,20;20,21-bismethylenedioxy-$\Delta^5$-pregnen-3β-ol-11-one in 30 cc. of methylene chloride, the solution was cooled to 0° C. and a solution of 12 g. of anhydrous hydrogen fluoride in 20 cc. of tetrahydrofuran cooled in a Dry Ice-acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 3β-fluoro-17,20;20,21-bismethylenedioxy-$\Delta^5$-pregnen-11-one.

Example V

A solution of 4 g. of 3β-chloro-17,20;20,21-bismethylenedioxy-$\Delta^5$-pregnen-11-one in 40 cc. of tetrahydrofuran was added in a steady stream to a solution of 1 g. of of sodium in 200 cc. of liquid ammonia with good stirring. After 5 minutes, methanol was added dropwise until the blue color was discharged and the ammonia was then allowed to evaporate. The resulting mixture was evaporated to dryness and the residue taken up in benzene. The mixture was washed with dilute hydrochloric acid, water to neutral, dried over anhydrous sodium sulfate and evaporated to dryness. Crystallization from methylene chloride-acetone yielded 17,20;20,21-bismethylenedioxy-$\Delta^5$-pregnen-11α-ol.

Example VI

A solution of 2 g. of the above product in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 17,20;20,21-bismethylenedioxy-$\Delta^5$-pregnen-11-one.

Example VII

A solution of 2 g. of sodium borohydride in 3 cc. of water was added to an ice-cooled solution of 2 g. of 3β-chloro-17,20;20,21-bismethylenedioxy - $\Delta^5$ - pregnene-11-one, in 220 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 3β-chloro-17,20;20,21-bismethylenedioxy-$\Delta^5$-pregnen-11β-ol.

Following the same technique, there were reduced 17,20;20,21-bismethylenedioxy-$\Delta^5$-pregnen-11-one, 3β-bromo-17,20;20,21-bismethylenedioxy-$\Delta^5$-pregnen-11-one and 3β-fluoro-17,20;20,21-bismethylenedioxy-$\Delta^5$-pregnen-11-one, thus giving
17,20;20,21-bismethylenedioxy-$\Delta^5$-pregnene-11β-ol,
3β-bromo-17,20;20,21-bismethylenedioxy-$\Delta^5$-pregnene-11β-ol and
3β-fluoro-17,20;20,21-bismethylenedioxy-$\Delta^5$-pregnen-11β-ol.

Example VII 1 g. of 3β-chloro-17,20;20,21-bismethylenedioxy-$\Delta^5$-pregnen-11-one was heated under reflux with 100 cc. of 50% acetic acid under nitrogen for 25 minutes, it was then concentrated under vacuum to a small volume and poured into water. The precipitate was collected, washed well with water, dried and recrystallized from acetone-hexane, thus furnishing 3β-chloro-$\Delta^5$-pregnen-17α,21-diol-11,20-dione.

Following the same procedure were treated
17,20;20,21-bismethylenedioxy-$\Delta^5$-11β-ol,
17,20;21-bismethylenedioxy-$\Delta^5$-pregnen-11-one,
3β-chloro-17,20;20,21-bismethylenedioxy-$\Delta^5$-pregnen-11β-ol,
3β-bromo-17,20;20,21-bismethylenedioxy-$\Delta^5$-pregnen-11β-ol,
3β-bromo-17,20;20,21-bismethylenedioxy-$\Delta^5$-pregnen-11-one,
3β-fluoro-17,20;20,21-bismethylenedioxy-$\Delta^5$-pregnen-11-one and 3β-fluoro-17,20;20,21-bismethylenedioxy-Δ⁵-
  pregnen-11β-ol, thus giving respectively
Δ⁵-pregnen-11β,17α,21-triol-20-one,
Δ⁵-pregnen-17α,21-diol-11,20-dione,
3β-chloro-Δ⁵-pregnen-11β,17α,21-triol-20-one,
3β-bromo-Δ⁵-pregnen-11β,17α,21-triol-20-one,
3β-bromo-Δ⁵-pregnen-17α,21-diol-11,20-dione,
3β-fluoro-Δ⁵-pregnen-17α,21-diol-11,20-dione, and
3β-fluoro-Δ⁵-pregnen-11β,17α,21-triol-20-one.

*Example IX*

A mixture of 1 g. of 3β-chloro-Δ⁵-pregnen-17α,21-diol-11,20-dione, 4 cc. of pyridine and 2 cc. of acetic anhydride was kept at room temperature overnight, poured into ice water, the formed precipitate was filtered, washed with water and dried. Crystallization from acetone-hexane gave 3β-chloro-Δ⁵-pregnen-17α,21-diol - 11,20 - dione-21-acetate.

By the same technique were treated
Δ⁵-pregnen-11β,17α-triol-20-one,
Δ⁵-pregnen-17α,21-diol-11,20-dione,
3β-chloro-Δ⁵-pregnen-11β,17α,21-triol-20-one,
3β-bromo-Δ⁵-pregnen-11β,17α,21-triol-20-one,
3β-bromo-Δ⁵-pregnen-17α,21-diol-11,20-dione,
3β-fluoro-Δ⁵-pregnen-17α,21-diol-11,20-dione and
3β-fluoro-Δ⁵-pregnen-11β,17α,21-triol-20-one
affording correspondingly
Δ⁵-pregnen-11β,17α,21-triol-20-one-21-acetate,
Δ⁵-pregnen-17α,21-diol-11,20-dione-21-acetate,
3β-chloro-Δ⁵-pregnen-11β,17α,21-triol-20-one-
  21-acetate,
3β-bromo-Δ⁵-pregnen-11β,17α,21-triol-20-one-
  21-acetate,
3β-bromo-Δ⁵pregnen-17α,21-diol-11,20-dione-
  21-acetate,
3β-fluoro-Δ⁵-pregnen-17α,21-diol-11,20-dione-
  21-acetate,
3β-fluoro-Δ⁵-pregnen-11β,17α,20-triol-20-one-
  21-acetate.

*Example X*

Following the technique described in the foregoing example except that acetic anhydride was substituted by propionic anhydride, caproic anhydride, cyclopentylpropionic anhydride and benzoyl chloride, there were correspondingly obtained the 21-propionates, 21-caproates, 21-cyclopentylpropionates and 21-benzoates of the starting compounds named in the same example.

We claim:
1. A compound of the following formula:

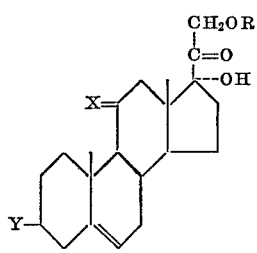

wherein X is a member of the group consisting of keto and β-hydroxy, Y is selected from the group consisting of hydrogen, fluorine, chlorine and bromine and R is a member of the group consisting of hydrogen and a hydrocarbon carboxylic acyl group of less than 12 carbon atoms.

2. A compound of the formula:

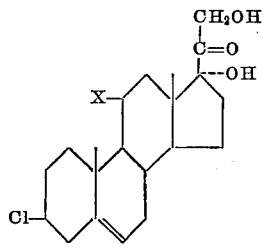

wherein X is a member of the group consisting of keto and β-hydroxy.
  3. Δ⁵-pregnen-11β,17α,21-triol-20-one.
  4. 3β-chloro-Δ⁵-pregnene-11β,17α,21-triol-20-one.
  5. 3β-chloro-Δ⁵-pregnen-17α,21-diol-11,20-dione.
  6. Δ⁵-pregnen-17α,21-diol-11,20-dione.
  7. 3β-bromo-Δ⁵-pregnen-17α,21-diol-11,20-dione.
  8. 3β-bromo-Δ⁵-pregnen-11β,17α,21-triol-20-one.
  9. 3β-fluoro-Δ⁵-pregnen-11β,17α,21-triol-20-one.
  10. 3β-fluoro-Δ⁵-pregnen-17α,21-diol-11,20-dione.
  11. The 21-esters of hydrocarbon carboxylic acids of less than 12 carbon atoms of Δ⁵-pregnen-11β,17α,21-triol-20-one.
  12. The 21-esters of hydrocarbon carboxylic acids of less than 12 carbon atoms of 3β-chloro-Δ⁵-pregnen-11β,17α,21-triol-20-one.
  13. The 21-esters of hydrocarbon carboxylic acids of less than 12 carbon atoms of 3β-chloro-Δ⁵-pregnen-17α,21-diol-11,20-dione.
  14. The 21-esters of hydrocarbon carboxylic acids of less than 12 carbon atoms of Δ⁵-pregnen-17α,21-diol-11,20-dione.
  15. The 21-esters of hydrocarbon carboxylic acids of less than 12 carbon atoms of 3β-bromo-Δ⁵-pregnen-17α,21-diol-11,20-dione.
  16. The 21-esters of hydrocarbon carboxylic acids of less than 12 carbon atoms of 3β-bromo-Δ⁵-pregnen-11β,17α,21-triol-20-one.
  17. The 21-esters of hydrocarbon carboxylic acids of less than 12 carbon atoms of 3β-fluoro-Δ⁵-pregnen-11β,17α,21-triol-20-one.
  18. The 21-esters of hydrocarbon carboxylic acids of less than 12 carbon atoms of 3β-fluoro-Δ⁵-pregnen-17α,21-diol-11,20-dione.
  19. A method for the production of 3β-halo-Δ⁵-pregnen-17α,21-diol-11,20-dione compounds which comprises treating 17,20;20,21 - bismethylenedioxy-Δ⁵-pregnen-3β-ol-11-one with a halogenating agent in an inert solvent and hydrolyzing the obtained 3β-halo-17,20;20,21-bismethylenedioxy-Δ⁵-pregnen-11-one derivative in an acid medium.
  20. The method of claim 19 wherein the halogenating agent is phosphorous pentachloride, the solvent is benzene and the acid medium is 50% acetic acid.
  21. The method of claim 19 wherein the halogenating agent is phosphorus pentabromide, the solvent is benzene and the acid medium is 50% acetic acid.
  22. The method of claim 19 wherein the halogenating agent is hydrogen fluoride, the solvent is a mixture of methylene chloride and tetrahydrofuran, and the acid medium is 50% acetic acid.
  23. The method for the production of Δ⁵-pregnen-11β,17α,21-triol-20-one which comprises treating a 3β-halo-17,20;20,21 - bismethylenedioxy-Δ⁵-pregnen-11-one compound with an alkali metal in ammonia, oxidizing the produced 17,20;20,21-bismethylenedioxy-Δ⁵-pregnen - 11α-ol with chromic acid, reducing the resulting 17,20;20,21-bismethylenedioxy - Δ⁵ - pregnene-11-one with a double metalhydride, and hydrolyzing the obtained 17,20;20,21-bismethylenedioxy-$\Delta^5$-pregnen-11$\beta$-ol in an acid medium.

24. The method of claim 23 wherein the alkali metal is sodium, the chromic acid is 8 N, the double metalhydride is sodium borohydride and the acid medium is 50% acetic acid.

No references cited.

LEWIS GOTTS, *Primary Examiner.*

MORRIS LIEBMAN, *Examiner.*

UNITED STATES PATENT OFFICE
CERTIFICATE OF CORRECTION

Patent No. 3,203,967 August 31, 1965

John A. Zderic et al.

It is hereby certified that error appears in the above numbered patent requiring correction and that the said Letters Patent should read as corrected below.

Column 1, lines 20 to 30, the formula should appear as shown below instead of as in the patent:

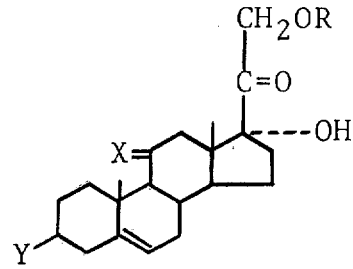

same column 1, lines 60 to 70, formula "II" should appear as shown below instead of as in the patent:

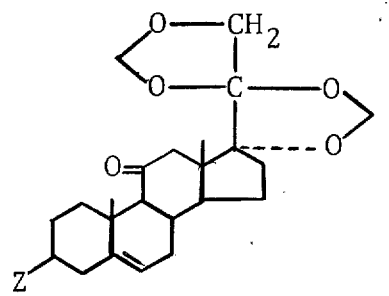

Signed and sealed this 5th day of April 1966.

(SEAL)
Attest:

ERNEST W. SWIDER
Attesting Officer

EDWARD J. BRENNER
Commissioner of Patents